United States Patent
Nakamura (10) Patent No.: US 8,382,130 B2
(45) Date of Patent: Feb. 26, 2013

(54) VEHICULAR SUSPENSION SYSTEM AND VEHICLE INCORPORATING SAME

(75) Inventor: Koshi Nakamura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 222 days.

(21) Appl. No.: 12/828,397

(22) Filed: Jul. 1, 2010

(65) Prior Publication Data

US 2011/0025012 A1 Feb. 3, 2011

(30) Foreign Application Priority Data

Jul. 29, 2009 (JP) .................................. 2009-176360

(51) Int. Cl.
*B60G 3/18* (2006.01)

(52) U.S. Cl. ............................... 280/124.135; 280/5.521

(58) Field of Classification Search ........... 280/124.134, 280/124.135, 124.145, 5.52, 5.521
See application file for complete search history.

(56) References Cited

U.S. PATENT DOCUMENTS

| | | | | | |
|---|---|---|---|---|---|
| 3,118,687 | A | * | 1/1964 | Forbush | 280/124.136 |
| 4,657,271 | A | * | 4/1987 | Salmon | 280/124.139 |
| 5,037,127 | A | * | 8/1991 | Lin | 280/124.135 |
| 5,431,429 | A | * | 7/1995 | Lee | 280/124.139 |
| 5,620,199 | A | * | 4/1997 | Lee | 280/5.521 |
| 7,407,174 | B2 | * | 8/2008 | Kusaka et al. | 280/124.136 |
| 2001/0028156 | A1 | * | 10/2001 | Handa | 280/93.512 |
| 2005/0248116 | A1 | * | 11/2005 | Fanson | 280/124.139 |
| 2006/0244235 | A1 | * | 11/2006 | Kusaka et al. | 280/124.136 |
| 2007/0131474 | A1 | * | 6/2007 | Zetterstroem | 180/411 |
| 2007/0176387 | A1 | * | 8/2007 | Tsuruta et al. | 280/124.135 |
| 2010/0078911 | A1 | * | 4/2010 | Kawabe et al. | 280/124.144 |
| 2010/0102527 | A1 | * | 4/2010 | Yanagida | 280/124.135 |

FOREIGN PATENT DOCUMENTS

JP 62-061889 A 3/1987

* cited by examiner

*Primary Examiner* — Paul N Dickson
*Assistant Examiner* — Barry Gooden, Jr.
(74) *Attorney, Agent, or Firm* — Carrier Blackman & Associates, P.C.; Joseph P. Carrier; William D. Blackman (57) ABSTRACT

A vehicle suspension system includes a vertically reciprocally movable suspension arm assembly having a minimal number of component parts and configured to be light in weight. The suspension arm assembly includes a lower arm portion including a plurality of arm members which are operatively connected together via a plurality of hinge joints. The arm members are operatively associated with each other in a manner so as to permit vertical reciprocating movement of a wheel, and are interconnected in a manner so as to permit a shock absorber to make a stroke motion, where one end of the shock absorber is attached to a portion of a vehicle body, and another end of the shock absorber is attached to one of the arm members.

19 Claims, 5 Drawing Sheets

VEHICULAR SUSPENSION SYSTEM AND VEHICLE INCORPORATING SAME

CROSS-REFERENCE TO RELATED APPLICATIONS

The present invention claims priority under 35 USC 119 based on Japanese patent application No. 2009-176360, filed on Jul. 29, 2009. The entire subject matter of this priority document, including specification claims and drawings, is incorporated by reference herein.

BACKGROUND AND SUMMARY OF THE INVENTION

1. Technical Field of the Invention

The present invention relates to a suspension system suitable for a relatively small vehicle such as, for example, a saddle-riding type vehicle.

2. Background Art

An arrangement of a suspension system is known for a saddle-type vehicle, including a linkage mechanism disposed between a vertically reciprocally movable suspension arm and a vehicle body, and a shock absorber having one end connected to the linkage mechanism (see, for example, Japanese Laid-Open Patent Document No. Sho 62-61889.

In the known arrangement mentioned above, suspension performance can be improved by varying a stroke ratio (a ratio of an extension/contraction amount of the shock absorber relative to a vertical movement of a wheel) of the suspension system according to the vertical movement of the wheel. On the other hand, having the linkage mechanism separately from the suspension arm tends increase both the number of component parts used and the weight, and to impose restrictions on a degree of freedom in layout. In addition, the suspension arm is formed from a single member, which makes it difficult to tune the stroke ratio.

It is therefore an object of the present invention to enhance, in a vehicle suspension system having a vertically reciprocally movable suspension arm, the degree of freedom in layout and in setting the stroke ratio by minimizing the increase in the number of parts used and weight.

In order to solve the abovementioned problems, according to a first aspect of the present invention, there is provided a vehicle suspension system (for example, a front suspension 57 according to an embodiment of the present invention) includes a vehicle body frame (for example, a vehicle body frame 4 according to the embodiment of the present invention) that constitutes a vehicle body; a suspension arm (for example, a lower A-arm 62 according to the embodiment of the present invention) that has a first end pivotally attached to the vehicle body frame and a second end supporting a wheel (for example, a front wheel 2 according to the embodiment of the present invention).

The vehicle suspension system according to the first aspect also includes a shock absorber (for example, a shock absorber 58 according to the embodiment of the present invention) that has a first end connected to a side of the vehicle body frame and a second end connected to a side of the suspension arm. In this vehicle suspension system, the suspension arm includes: a first arm member (for example, a first arm member 65 according to the embodiment of the present invention) that has a first end pivotally attached to the vehicle body frame; a second arm member (for example, a second arm member 66 according to the embodiment of the present invention) that has a first end pivotally connected to a second end of the first arm member and a second end supporting a wheel; and a third arm member (for example, a third arm member 67 according to the embodiment of the present invention) that has a first end pivotally attached to the vehicle body frame and a second end disposed on the second arm member. Each of the first, second, and third arm members is pivotally connected to each other via a joint (for example, each of joints 68, 70 according to the embodiment of the present invention) and operatively associated with each other according to a vertical movement of the wheel to thereby cause the shock absorber to make a stroke motion.

According to another aspect of the present invention, the first arm member and the second arm member are disposed so as to form substantially a V-shape as viewed along a pivot shaft thereof.

According to still another aspect of the present invention, the second arm member is connected to both the second end of the shock absorber and the second end of the third arm member.

According to a further aspect of the present invention, the suspension arm is, in an independent suspension type suspension (for example, the front suspension 57 according to the embodiment of the present invention) having a knuckle (for example, a knuckle 63 according to the embodiment of the present invention) supported on distal ends of an upper arm (for example, an upper A-arm 61 according to the embodiment of the present invention) and a lower arm(for example, a lower A-arm 62 according to the embodiment of the present invention), the lower arm.

According to still another aspect of the present invention, the suspension system is a double wishbone type suspension for a front wheel in a rear-wheel-drive all-terrain vehicle (ATV).

According to the first aspect of the present invention, a linkage mechanism can be formed from the suspension arm that includes a plurality of arm members without having a linkage mechanism separately, so that the number of parts used and weight of the suspension system can be minimized to thereby enhance a degree of freedom in layout and a degree of freedom in setting the stroke ratio of the suspension system.

According to the second aspect of the present invention, the distal portion of the shock absorber can be connected near a bottom portion of the suspension arm that is substantially formed into a V-shape in a view as viewed in the direction of the pivot shaft. The shock absorber can be disposed at a lower level for a lower center of gravity and a stroke amount of the shock absorber can be increased.

Further, according to the third aspect of the present invention, the shock absorber can be disposed at an even lower level for an even lower center of gravity and a stroke amount of the shock absorber can be further increased. This is particularly effective in applying the present invention to a suspension system for a all-terrain vehicle.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

It should be understood that only structures considered necessary for clarifying the present invention are described herein. Other conventional structures, and those of ancillary and auxiliary components of the system, will be known and understood by those working in the art.

A specific embodiment to which the present invention is applied will be described below with reference to the accompanying drawings. Throughout the descriptions given hereunder, expressions indicating directions including front and rear, and right and left, mean the same directions as those in a vehicle, taken from a vantage point of a driver seated in the vehicle and facing forward, unless otherwise specified. In the drawings, an arrow FR indicates forward of the vehicle, an arrow LH indicates leftward of the vehicle, and an arrow UP indicates upward of the vehicle.

Figure 1:
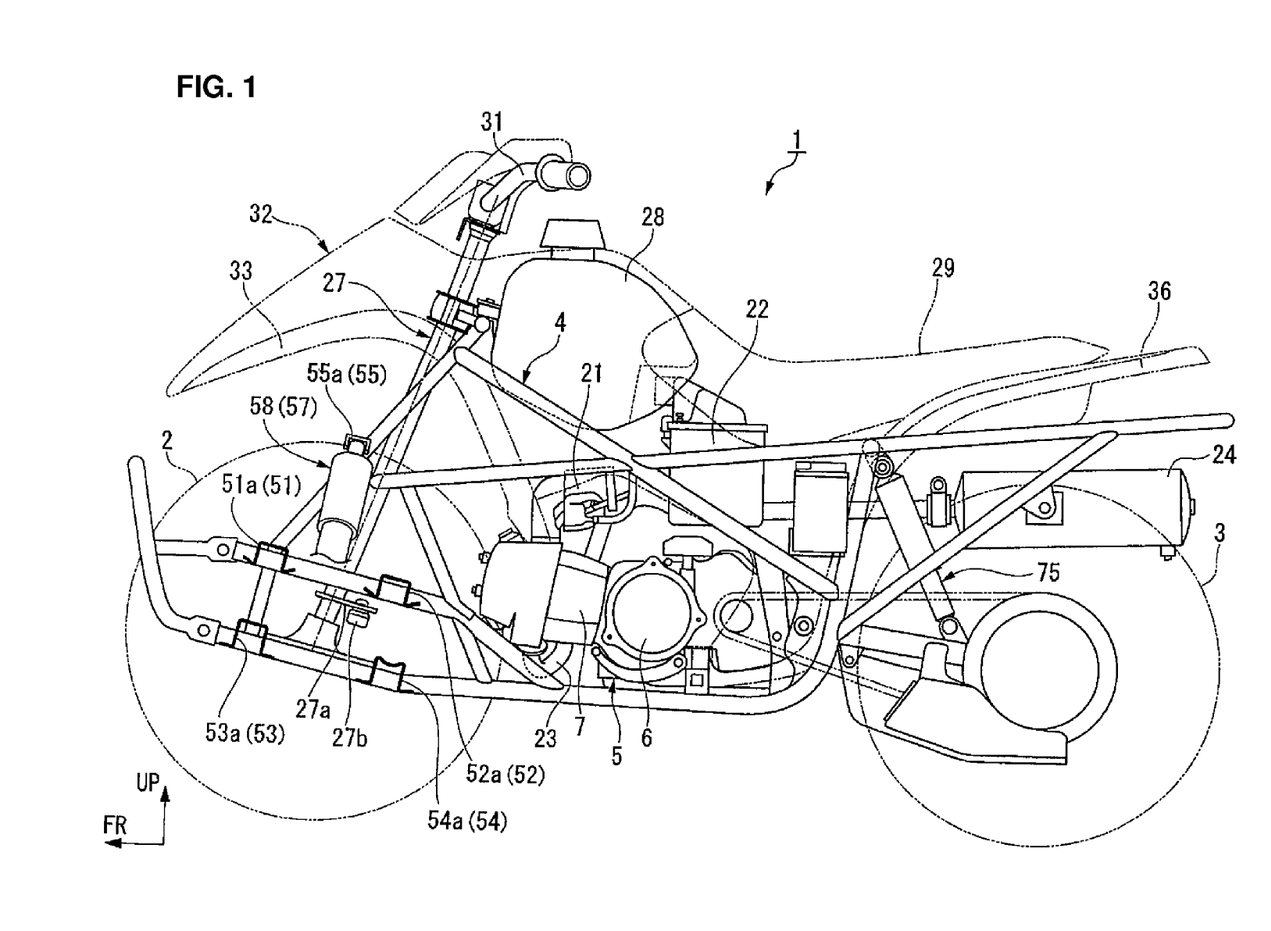
FIG. 1 is a left side elevational view showing a saddle-riding type vehicle according to an embodiment of the present invention.

A saddle-riding type, four-wheeled vehicle 1, which is a so-called all terrain vehicle (ATV), is shown in FIG. 1. The vehicle 1 includes a relatively compact and lightweight vehicle body frame 4 having left and right front wheels 2 and rear wheels 3 mounted with relatively large-diameter low pressure balloon tires, respectively disposed at front and rear ends thereof. The saddle-riding type, four-wheeled vehicle 1 is given a large minimum road clearance to achieve good running performance when operating off-road or on rough roads.

The left and right front wheels 2 are suspended at a front portion of the vehicle body frame 4 via an independent, double wishbone type front suspension 57. The left and right rear wheels 3 are suspended at a rear portion (a sub-frame 60) of the vehicle body frame 4 via, for example, a rigid axle (swing arm type) rear suspension 75.

An engine 5, as a prime mover of the saddle-riding type four-wheeled vehicle 1, is mounted at a substantially central portion of the vehicle body frame 4. The engine 5 may, for example, be a single-cylinder engine. The engine 5 is disposed such that a rotation axis of a crankshaft extends in a vehicle width direction (crosswise direction) and has a basic configuration in which a cylinder 7 is extends forwardly of a crankcase 6 thereof. Power drive transmission can be achieved between an output shaft of the engine 5 and an axle of the rear wheels 3 by, for example, a chain transmission mechanism. Specifically, the saddle-riding type, four-wheeled vehicle 1 of the depicted embodiment is a two-wheel-drive, rear wheel drive all-terrain vehicle.

A throttle body 21 is connected to an upper portion of the cylinder 7 of the engine 5. An air cleaner case 22 is connected to a rear portion of the throttle body 21. On the other hand, an exhaust pipe 23 is connected to a lower portion of the cylinder 7. The exhaust pipe 23 is extended rearwardly so as to turn backward and then connected to a muffler 24 disposed at a rear portion of the vehicle body.

At a central upper portion of the vehicle body of the vehicle 1 are, for example, a steering shaft 27, a fuel tank 28, and a saddle-riding type seat 29, disposed in that order from the front side. A handlebar 31 is disposed at an upper end portion of the steering shaft 27. A front wheel steering mechanism is connected to a lower end portion of the steering shaft 27.

A plastic vehicle body cover 32 and a plastic front fender 33 are disposed at a front upper portion of the vehicle body. Specifically, the vehicle body cover 32 appropriately covers the front portion of the vehicle body. The front fender 33 covers the left and right front wheels 2 in a space extending from an upward area to a rearward area of the front wheels 2. The vehicle 1 further includes a plastic rear fender 36 disposed at a rear portion of the vehicle body. The rear fender 36 covers the left and right rear wheels 3 in a space extending from an upward area to a frontward area of the rear wheels 3.

The vehicle body frame 4 is formed from steel stocks of a plurality of types joined together through, for example, welding. More specifically, the vehicle body frame 4 forms a longitudinally extending box structure at the crosswise center portion of the vehicle body by forming a pair of left and right closed loop structures and connecting the closed loop structures with a plurality of crossmembers.

Figure 2:
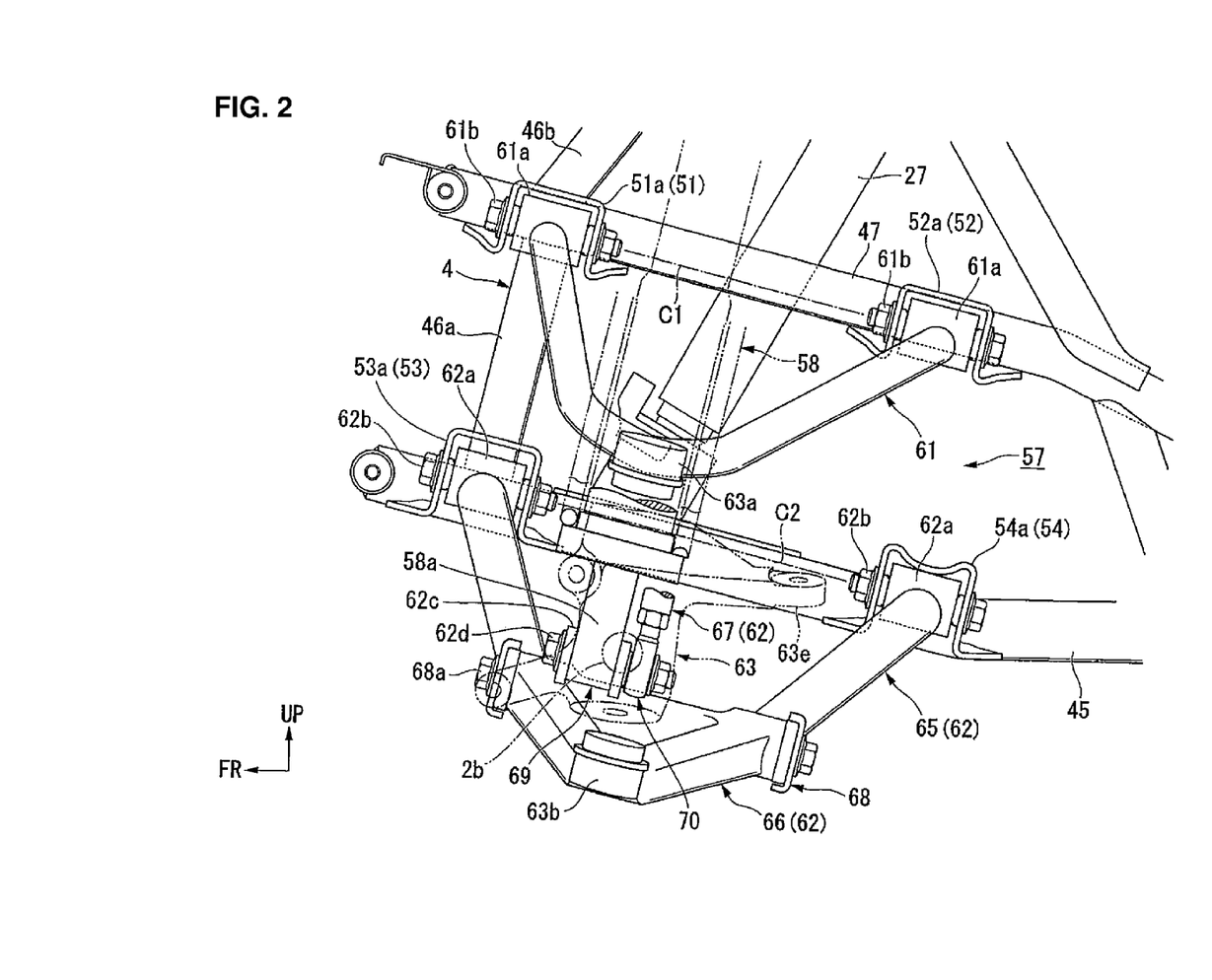
FIG. 2 is a left side elevational view showing a front suspension of the saddle-riding type vehicle according to the embodiment of the present invention.

The front portion of the vehicle body frame 4 and the front suspension 57 will be described below with reference to FIGS. 2 and 3.

A longitudinally extending lower front main pipe 45 and a lower front branch pipe 47 are disposed at the front side of a lower portion of the vehicle body frame 4 with the branch pipe 47 disposed above the main pipe 45, as shown. A vertically extending front connector pipe 46a connects respective front end portions of the lower front main pipe 45 and the lower front branch pipe 47. An upper front pipe 46b extends upwardly from a front end portion of the lower front branch pipe 47.

A lower front crossmember 53 and a lower rear crossmember 54 connect front end portions and rear end portions, respectively, of the left and right lower front main pipes 45. A middle front crossmember 51 and a middle rear crossmember 52 connect front end portions and rear end portions, respectively, of the left and right lower front branch pipes 47. An upper crossmember 55 connects upper portions of the left and right upper front pipes 46b.

An upper A-arm 61 of the front suspension 57 has integral tubular bosses 61a thereon at proximal end sides at the front and rear thereof pivotally attached to the outside ends of the middle front crossmember 51 and the middle rear crossmember 52, so that the distal portion of the A-arm 61 is vertically reciprocally movable. In a similar fashion, a lower A-arm 62 of the front suspension 57 has integral tubular bosses 62a thereon at proximal end sides at the front and rear thereof pivotally attached to the outside ends of the lower front crossmember 53 and the lower rear crossmember 54, so that the distal portion of the A-arm 62 is also vertically reciprocally movable.

Upper and lower ends of a knuckle 63 are pivotally and rotatably supported on the distal portions of the upper A-arm 61 and the lower A-arm 62, respectively. A hub portion 2a of the front wheel 2 is rotatably supported on the outside of the knuckle 63.

Figure 3:
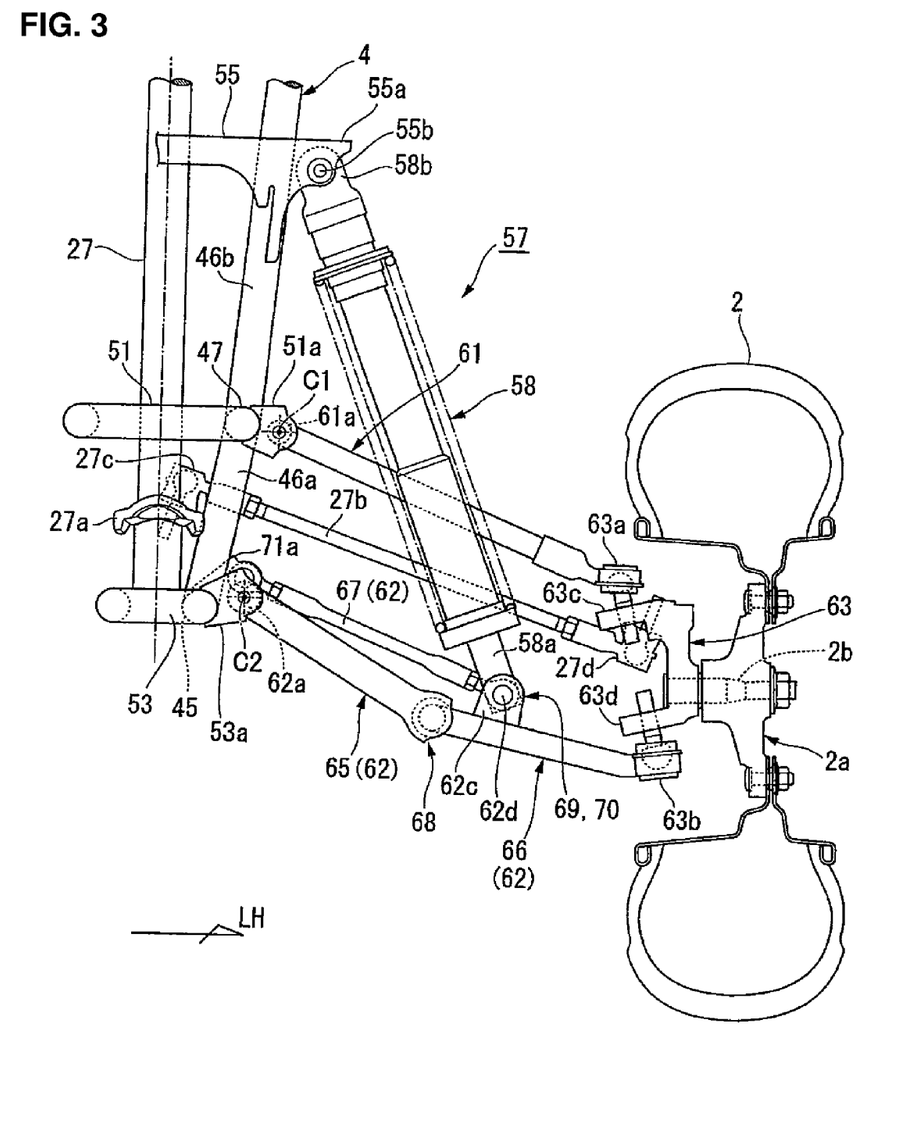
FIG. 3 is a front elevational view showing the front suspension as viewed in a direction along a pivot shaft.

As shown in FIG. 3, a shock absorber 58 is inserted, at each side of the vehicle body frame, between an outside end portion of the upper crossmember 55 and a shock absorber mounting bracket 62c attached to the lower A-arm 62.

At each of the left and right sides thereof, respectively, the front suspension 57 includes the upper and lower A-arms 61, 62, the knuckle 63, and the shock absorber 58. Specifically, each of the left and right upper A-arms 61 and lower A-arms 62 has a first end (the proximal end or a crosswise inside end) pivotally supported on either end at the front of the vehicle body frame 4. Each of the left and right knuckles 63 is supported via a ball-and-socket joint on each of a second end (the distal end or a crosswise outside end) of the left and right upper and lower A-arms 61, 62, respectively. Each of the left and right shock absorbers 58 is inserted between each of the lower arms 62 and the upper crossmember 55 at the front portion of the vehicle body frame 4. An axle 2b is disposed in a protruding condition on the outside of each of the left and right knuckles 63. The hub portion 2a of the front wheel 2 is supported on the axle 2b.

Figure 4:
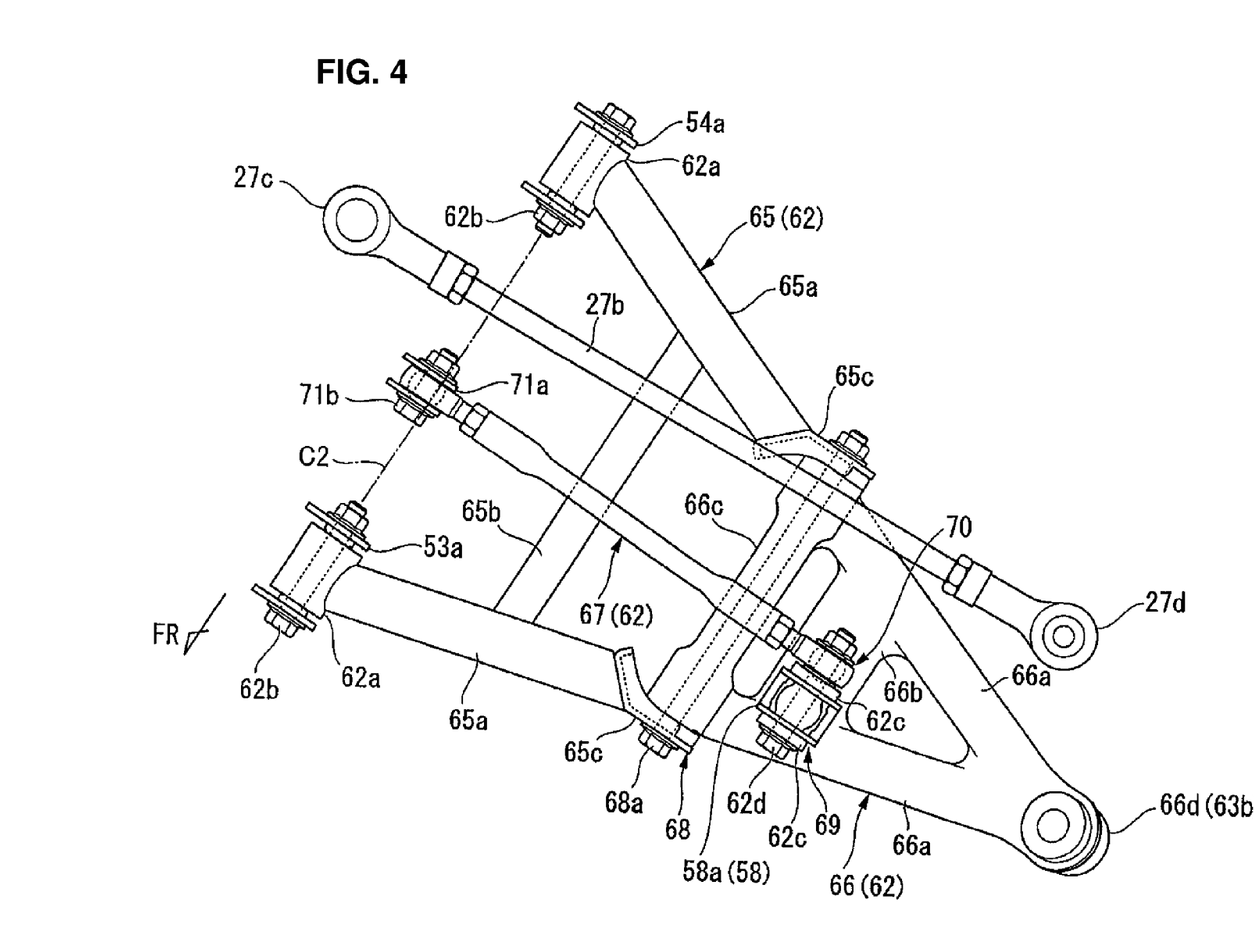
FIG. 4 is a plan view showing a lower arm of the front suspension.

Each of the upper and lower A-arms 61, 62 is formed substantially in a V-shape that widens so as to branch toward the vehicle body frame 4 side (the proximal end side) from the knuckle 63 side (the distal portion) as viewed from above in a top plan view. Short tubular frame connection portions 61a, 62a are integrally joined to each of the branched leading ends (the proximal ends at the front and rear of each) of the upper A-arm 61 and the lower A-arm 62, respectively. The tubular frame connection portions 61a, 62a are inclined downwardly toward the rear. The tubular frame connection portions 61a, 62a are disposed so as to extend in parallel with each other and share central axes C1, C2 of the upper A-arm 61 and the lower A-arm 62, respectively.

On the other hand, arm connection portions 51a, 52a are disposed on outside ends of the middle front crossmember 51 and the middle rear crossmember 52, respectively. The arm connection portions 51a, 52a correspond to the front and rear, respectively, at the proximal end of the upper A-arm 61. Similarly, arm connection portions 53a, 54a are disposed on outside ends of the lower step front crossmember 53 and the lower step rear crossmember 54. The arm connection portions 53a, 54a correspond to the front and rear, respectively, at the proximal end of the lower A-arm 62.

The tubular frame connection portions 61a or 62a of the upper A-arm 61 or the lower A-arm 62 are pivotally supported on the arm connection portions 51a, 52a or 53a, 54a via a pivot shaft 61b extending along the central axis C1 or a pivot shaft 62b extending along the central axis C2. Specifically, the upper A-arm 61 and the lower A-arm 62 have their proximal ends pivotally supported, on both sides thereof, at the front portion of the vehicle body frame 4. In accordance with the depicted embodiment of the present invention, the pivot shafts 61b, 62b are set as bolts which are held in place by corresponding nuts.

An upper wall portion 63c and a lower wall portion 63d of the knuckle 63 are pivotally and adjustably supported at the distal end of the upper A-arm 61 and the distal end of the lower A-arm 62 via a ball joint 63a and a ball joint 63b, respectively.

The lower A-arm 62 includes a shock absorber mounting bracket 62c that protrudes upwardly thereon. The shock absorber 58 has a lower end portion 58a connected pivotally to the shock absorber mounting bracket 62c via a connection shaft 62d that extends in parallel with the central axes C1, C2. The upper crossmember 55 includes a frame side mount 55a disposed on each of both outside ends thereof. The shock absorber 58 has an upper end portion 58b connected pivotally to the frame side mount 55a via a connection shaft 55b that extends in parallel with the central axes C1, C2. Each of the connection shafts 62d, 55b is set as a bolt.

When an impact load or the like is applied to the left and right front wheels 2 from a road surface, each of the left and right front wheels 2 vertically reciprocates by oscillations of the distal ends of the upper A-arm 61 and the lower A-arm 62, and each of the left and right shock absorbers 58 is individually extended or contracted, so that the load is mildly absorbed through a shock-absorbing action of these shock absorbers 58.

A Pitman arm 27a of the front wheel steering mechanism is integrally disposed at a lower end portion of the steering shaft 27. The Pitman arm 27a extends rearwardly from a lower end portion of the steering shaft 27. Each of left and right tie rods 27b has a proximal end portion connected to a distal end portion of a corresponding one of distal end portions of the Pitman arms 27a via a corresponding one of ball joints 27c. On the other hand, the tie rod 27b has a distal end portion connected to an operation arm portion 63e of the knuckle 63 via the ball joint 27d. This results in the left and right front wheels 2 being steered in the same direction via, for example, the left and right tie rods 27b when the handlebar 31 and the steering shaft 27 are turned.

Referring also to FIG. 4, the lower A-arm 62 is formed to include a plurality of arm members 65, 66, 67. These arm members 65, 66, 67 are mutually pivotally connected to each other via joints 68, 70.

Specifically, the lower A-arm 62 is formed to include a first arm member 65, a second arm member 66, and a third arm member 67. The first arm member 65 has a first end pivotally attached to the vehicle body frame 4. The second arm member 66 has a first end pivotally connected to a second end of the first arm member 65 and a second end supporting the knuckle 63. The third arm member 67 has a first end pivotally attached to the vehicle body frame 4, and a second end disposed on the second arm member 66.

The first arm member 65 integrates front and rear first arm segments 65a, a first cross brace 65b interconnecting medial portions of the front and rear first arm segments 65a, front and rear holding brackets 65c, and the front and rear tubular frame connection portions 62a. Specifically, the front and rear first arm segments 65a constitute front and rear proximal branch portions of the lower A-arm 62 on the vehicle body side. The first cross brace 65b extends between intermediate portions of the front and rear arm segments 65a, 65a on the vehicle body side. The front and rear holding brackets 65c are integrally formed on the outside ends of each of the front and rear arm segments 65a.

On the other hand, the second arm member 66 has a substantially triangular outline shape, as shown, and integrates front and rear second arm portions 66a, a second reinforcing member 66b, a pivot pipe 66c, and a stud retainer 66d for receiving a stud shaft portion of the ball joint 63b. Specifically, the front and rear second arm portions 66a constitute front and rear distal branch arm portions of the lower A-arm 62 on the wheel side. The second reinforcing member 66b connects between intermediate portions of the front and rear branch arm portions 66a on the wheel side. The pivot pipe 66c extends across inner side ends of the front and rear branch arm portions 66a on the wheel side. The stud retainer 66d is disposed on the distal end of the front and rear branch arm portions 66a on the wheel side.

The front and rear holding brackets 65c of the first arm member 65 and the pivot pipe 66c of the second arm member 66 are pivotally connected together via a connection shaft 68a that penetrates longitudinally through the front and rear holding brackets 65c and the pivot pipe 66c and extends in parallel with the central axes C1, C2. The connection shaft 68a, the front and rear holding brackets 65c, and the pivot pipe 66c constitute a first joint 68 that pivotally connects between the first arm member 65 and the second arm member 66. In accordance with the depicted embodiment of the present invention, the connection shaft 68a is set as a long bolt.

The shock absorber mounting bracket 62c mentioned earlier is disposed with two parallel plates extending upwardly on the second arm member 66 above the second reinforcing member 66b. The lower end portion 58a of the shock absorber 58 is pivotally connected to the shock absorber mounting bracket 62c via the connection shaft 62d, that extends in parallel with the central axes C1, C2. The connection shaft 62d and the shock absorber mounting bracket 62c constitute a second joint 69 that pivotally connects between the second arm member 66 and the shock absorber 58. In accordance with the depicted embodiment of the present invention, the connection shaft 62d is set as a bolt.

Further, the connection shaft 62d penetrates through the shock absorber mounting bracket 62c rearwardly and the second end of the third arm member 67 is pivotally connected to a portion of the connection shaft 62d that has penetrated through the shock absorber mounting bracket 62c. Specifically, the connection shaft 62d and the shock absorber mounting bracket 62c also constitute a third joint 70 that pivotally connects between the second arm member 66 and the third arm member 67.

In FIG. 4, reference symbol 71a denotes a third arm connection portion that pivotally connects the first end of the third arm member 67 and reference symbol 71b denotes a connection shaft that penetrates through, and connects together, the first end of the third arm member 67 and the third arm connection portion 71a and extends in parallel with the central axes C1, C2.

The first arm member 65 and the second arm member 66 are disposed so as to form a substantially vertically shallow V-shape as viewed along a pivot shaft thereof (the connection shaft 68a) (as viewed in a direction of the pivot shaft, substantially extending along the vehicle longitudinal direction, in a direction along the central axes C1, C2) (see FIG. 3). The distal portion of the first arm member 65 and the proximal end side of the second arm member 66 are disposed near a bottom portion of the abovementioned V-shape.

Consequently, the first joint 68, and the second joint 69 and the third joint 70 disposed therenear are disposed at a level lower than when the lower A-arm 62 extends linearly from the vehicle body frame 4 to the knuckle 63 as viewed in the direction of the pivot shaft. Note that the front suspension 57 shown in FIG. 3 is in a condition in which the shock absorber 58 makes a slight stroke motion (for example, a condition of 1G of only a vehicle weight).

In the view as viewed in the direction of the pivot shaft, the first end of the third arm member 67 is disposed immediately upwardly of the first end of the first arm member 65. On the other hand, in the view as viewed in the direction of the pivot shaft, the second end of the third arm member 67 (and a second end of the shock absorber 58) is disposed being slightly spaced apart upwardly from a crosswise outside of the second end of the first arm member 65. Specifically, a distance between the second end of the third arm member 67 and the second end of the first arm member 65 is made greater than a distance between the first end of the third arm member 67 and the first end of the first arm member 65.

Through the foregoing arrangements, in a condition in which the lower A-arm 62 oscillates downwardly (the condition shown in FIG. 3), the first arm member 65 and the second arm member 66 of the lower A-arm 62 are disposed to form the substantially vertically shallow V-shape in the view as viewed in the direction of the pivot shaft. On the other hand, in a condition in which the front wheel load increases, so that the lower A-arm 62 oscillates upwardly about the pivot shaft (the condition shown in FIG. 5), the first arm member 65 and the second arm member 66 that form the V-shape oscillate mutually about the pivot shaft to enlarge the angle formed therebetween (so that the first arm member 65 and the second arm member 66 extend linearly in the view as viewed in the direction of the pivot shaft).

Figure 5:
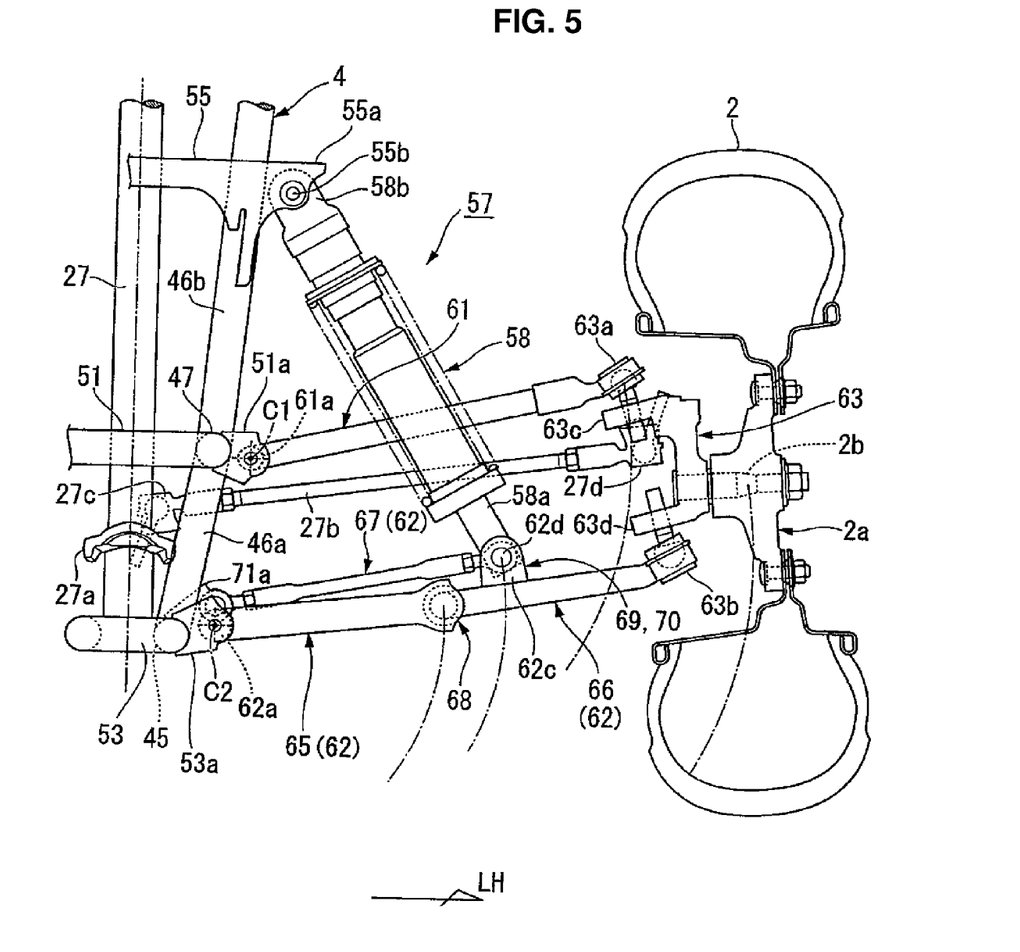
FIG. 5 is a front elevational view showing an operation of the front suspension, corresponding to FIG. 4.

As the lower A-arm 62 oscillates vertically, the distance between the proximal end and the distal end thereof increases or decreases, if not largely, as described above. This allows the angle of the knuckle 63 in the view as viewed in the direction of the pivot shaft to be varied to any angle, so that a camber angle of the front wheels 2 can be varied as required.

In addition, the second arm member 66 oscillates relative to the first arm member 65. This allows the extension/contraction amount of the shock absorber 58 relative to a vertical movement of the front wheel 2 to be varied also as required. The stroke ratio (the ratio of the extension/contraction amount of the shock absorber 58 relative to the vertical movement of the front wheel 2) of the front suspension 57 can therefore be varied as required.

As described heretofore, the vehicle suspension system according to the embodiment of the present invention (front suspension 57) includes the vehicle body frame 4 that constitutes the vehicle body; the suspension arm (lower A-arm 62) that has the first end pivotally attached to the vehicle body frame 4 and the second end supporting the front wheel 2; and the shock absorber 58 that has the first end connected to the side of the vehicle body frame 4 and the second end connected to the side of the suspension arm. In this vehicle suspension system, the suspension arm includes the first arm member 65, the second arm member 66, and the third arm member 67. Each of the first, second, and third arm members 65, 66, 67 is pivotally connected to each other via the joints 68, 70 and operatively associated with each other according to the vertical movement of the front wheel 2 to thereby cause the shock absorber 58 to make a stroke motion.

According to the foregoing arrangements, a linkage mechanism can be formed from the lower A-arm 62 that includes the first, second, and third arm members 65, 66, 67 without having a linkage mechanism separately, so that the number of parts used and weight of the suspension system can be minimized to thereby enhance the degree of freedom in layout and the degree of freedom in setting the stroke ratio of the suspension system.

Additionally, in the vehicle suspension system, the lower A-arm 62 includes: the first arm member 65 that has the first end pivotally attached to the vehicle body frame 4; the second arm member 66 that has the first end pivotally connected to the second end of the first arm member 65 and the second end supporting the front wheel 2; and the third arm member 67 that has the first end pivotally attached to the vehicle body frame 4 and the second end disposed on the second arm member 66. The first arm member 65 and the second arm member 66 are disposed so as to form substantially a V-shape as viewed along the pivot shaft thereof. The second end of the shock absorber 58 is connected, together with the second end of the third arm member 67, to the second arm member 66.

According to the foregoing arrangements, the distal portion of the shock absorber 58 can be connected near the bottom portion of the lower A-arm 62 that is substantially formed into a V-shape in the view as viewed in the direction of the pivot shaft. The shock absorber 58 can be disposed at a lower level for a lower center of gravity and the stroke amount of the shock absorber 58 can be increased.

Additionally, in the vehicle suspension system, the lower A-arm 62 includes, in the front suspension 57 having the knuckle 63 supported on the distal ends of the upper A-arm 61 and the lower A-arm 62, the first, second, and third arm members 65, 66, 67.

According to the foregoing arrangements, the shock absorber 58 can be disposed at an even lower level for an even lower center of gravity and the stroke amount of the shock absorber 58 can be further increased. This is particularly effective in applying the present invention to a suspension system for a all-terrain vehicle.

It should be noted that the present invention is not limited to the above-described embodiment. For example, the present invention may be applied to a rigid axle (swing arm type) rear suspension 75 in which the pivot shaft of the suspension arm and the axle extend in parallel with each other. Alternatively, the upper A-arm 61 of the front suspension 57 may be configured to include a plurality of arm members.

While the present invention has been particularly shown and described with reference to a preferred embodiment, it will be understood by those skilled in the art that the present invention may be applied to a vehicle having an independent rear suspension and various changes in form and detail may be made therein without departing from the spirit and scope of the invention.

What is claimed is:

1. In a vehicle having a vehicle body frame, a vehicle suspension system comprising:
   a suspension arm having a first end pivotally attached to the vehicle body frame and a second end which forms part of a wheel-supporting structure; and
   a shock absorber having a first end operatively connected to a portion of the vehicle body frame, and a second end connected to the suspension arm;
   wherein the suspension arm comprises:
      a first arm member having a proximal end pivotally attached to the vehicle body frame and a distal end spaced away from the vehicle body frame, the first arm member comprising a first arm segment, a second arm segment, and a cross brace interconnecting respective medial portions of the first and second arm segments;
      a second arm member having a first end pivotally connected to the distal end of the first arm member and a second end for operatively supporting part of a steering knuckle, and
      a third arm member having a first end pivotally attached to the vehicle body frame and a second end operatively attached to the second arm member;
      wherein the first, second, and third arm members are operatively interconnected via a plurality of pivotally movable connection joints, and are configured and arranged to permit the shock absorber to make a stroke motion during vertical movement of a wheel of the vehicle.

2. The vehicle suspension system according to claim 1, wherein the suspension arm is a lower arm of an independent suspension having said steering knuckle supported on distal ends of an upper arm and the lower arm.

3. The vehicle suspension system of claim 1, wherein the second arm member has a substantially triangular outline shape.

4. The vehicle suspension system of claim 1, wherein the second arm member has a shock absorber support bracket thereon for supporting the second end of the shock absorber, and wherein the second end of the third arm member is operatively attached to the shock absorber support bracket proximate the second end of the shock absorber.

5. The vehicle suspension system of claim 1, wherein each of the first and second arm segments of the first arm member has an integral tubular boss thereon, and wherein the tubular bosses of the first and second arm segments have a common pivot axis.

6. The vehicle suspension system of claim 5, wherein the first end of the third arm member has a pivot axis which is different from the common pivot axis of the first arm member.

7. The vehicle suspension system according to claim 1, wherein the first and second arm members cooperate so as to substantially form a V-shape, as viewed in a top plan view thereof.

8. The vehicle suspension system according to claim 7, wherein the second end of the shock absorber is operatively connected to the second arm member.

9. The vehicle suspension system according to claim 7, wherein the suspension arm is a lower arm of an independent suspension having said steering knuckle supported on distal ends of an upper arm and the lower arm.

10. The vehicle suspension system according to claim 1, wherein the second end of the shock absorber is operatively connected to the second arm member.

11. The vehicle suspension system according to claim 10, wherein the suspension arm is a lower arm of an independent suspension having said steering knuckle supported on distal ends of an upper arm and the lower arm.

12. The vehicle suspension system according to claim 11, wherein the suspension system is a double wishbone suspension for movably supporting a front wheel in a rear-wheel-drive all-terrain vehicle.

13. In a vehicle having a vehicle body frame, a vehicle suspension system comprising:
   a suspension arm having a first end pivotally attached to the vehicle body frame and a second end which forms part of a wheel-supporting structure; and
   a shock absorber having an upper end which is operatively connected to a portion of the vehicle body frame, and a lower end connected to the suspension arm;
   wherein the suspension arm comprises:
      a first arm member having a proximal end pivotally attached to the vehicle body frame, a distal end spaced away from the vehicle body frame, said first arm member comprising a first arm segment, a second arm segment, and a cross brace interconnecting medial portions of the first and second arm segments, respectively;
      a second arm member having a substantially triangular outline shape, the second arm member comprising a first end pivotally connected to the distal end of the first arm member and a second end spaced away from the first end and configured for operatively supporting part of a steering knuckle thereon, the second arm member having a shock absorber support bracket thereon for supporting the lower end of the shock absorber, wherein the first and second arm members cooperate to form an A-arm; and
      a third arm member having a first end pivotally attached to the vehicle body frame and a second end pivotally attached to the second arm member at the shock absorber support bracket; and
      wherein the first, second, and third arm members are configured and arranged to permit the shock absorber to make a stroke motion during vertical movement of a wheel of the vehicle.

14. The vehicle suspension system according to claim 13, wherein the suspension arm is a lower arm of an independent suspension having said steering knuckle supported on distal ends of an upper arm and the lower arm.

15. The vehicle suspension system according to claim 13, wherein the suspension system is a double wishbone suspension for movably supporting a front wheel of a rear-wheel-drive all-terrain vehicle.

16. A vehicle comprising a vehicle body frame, and a double wishbone front suspension system comprising:
- an upper suspension arm having an inner end pivotally attached to the vehicle body frame and an outer end which forms part of a wheel-supporting structure;
- a lower suspension arm having an inner end pivotally attached to the vehicle body frame and an outer end which forms part of a wheel-supporting structure;
- a steering knuckle which is attached to the respective outer ends of the upper and lower suspension arms; and
- a shock absorber having an upper end which is operatively connected to a portion of the vehicle body frame, and a lower end connected to the lower suspension arm;
- wherein the lower suspension arm comprises:
  - a first arm member having a proximal end pivotally attached to the vehicle body frame, a distal end spaced away from the vehicle body frame, said first arm member comprising a first arm segment, a second arm segment, and a cross brace interconnecting medial portions of the first and second arm segments, respectively;
  - a second arm member having a substantially triangular outline shape, the second arm member comprising a first end pivotally connected to the distal end of the first arm member and a second end spaced away from the first end and configured for operatively supporting part of a steering knuckle thereon, the second arm member having a shock absorber support bracket thereon for supporting the lower end of the shock absorber, wherein the first and second arm members cooperate to form an A-arm; and
  - a third arm member having a first end pivotally attached to the vehicle body frame and a second end pivotally attached to the second arm member at the shock absorber support bracket; and
  - wherein the first, second, and third arm members are configured and arranged to permit the shock absorber to make a stroke motion during vertical movement of a wheel of the vehicle.

17. The vehicle of claim 16, wherein the vehicle is a rear-wheel drive all-terrain vehicle.

18. The vehicle suspension system of claim 16, wherein each of the first and second arm segments of the first arm member has an integral tubular boss thereon, and wherein the tubular bosses of the first and second arm segments have a common pivot axis.

19. The vehicle suspension system of claim 18, wherein the first end of the third arm member has a pivot axis which is different from the common pivot axis of the first arm member.

* * * * *